May 28, 1940.  A. BERGER  2,202,643
INTERNAL COMBUSTION ENGINE
Filed May 13, 1936
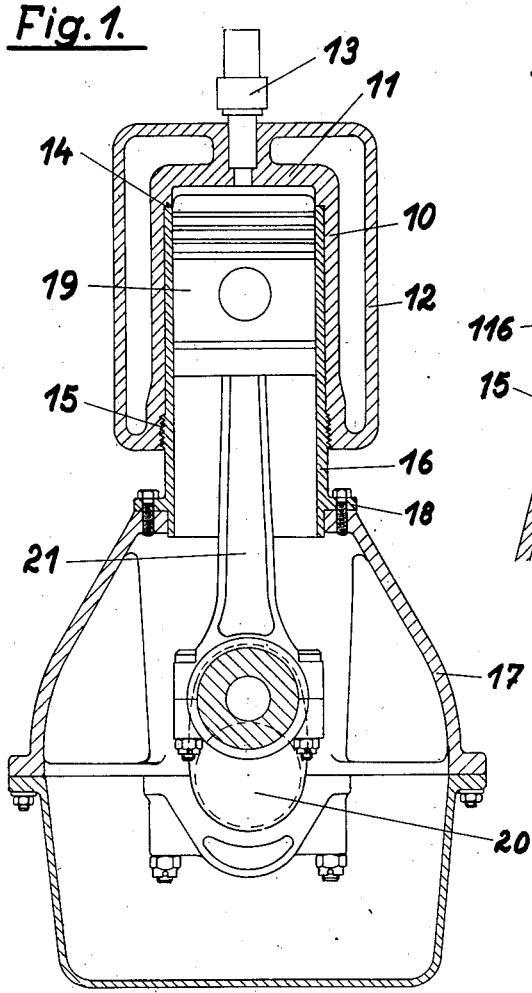
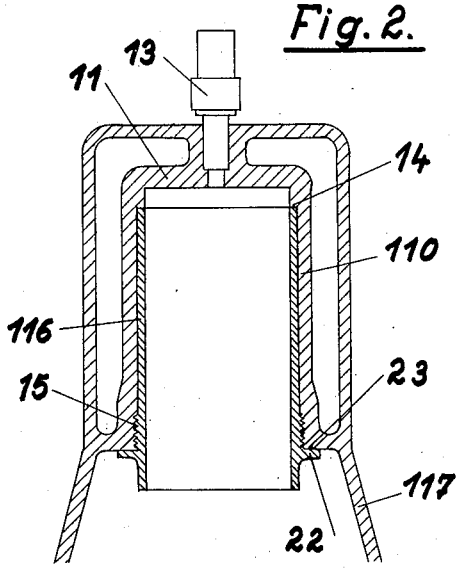
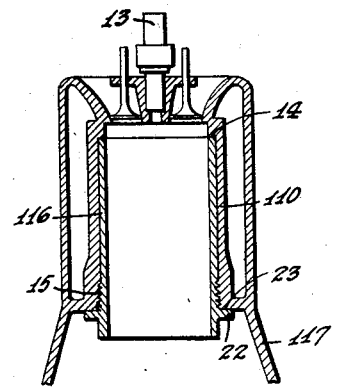
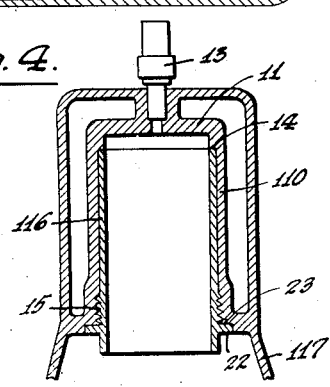
Inventor
Arthur Berger
by A. A. Dicke
Attorney Patented May 28, 1940

2,202,643

UNITED STATES PATENT OFFICE 2,202,643

INTERNAL COMBUSTION ENGINE

Arthur Berger, Oberturkheim, near Stuttgart, Germany, assignor to Daimler-Benz Aktiengesellschaft, Stuttgart - Unterturkheim, Germany Application May 13, 1936, Serial No. 79,413
In Germany May 16, 1935

2 Claims. (Cl. 123—173)

My invention relates to internal combustion engines, more particularly, to the construction of the cylinders thereof.

The object of my invention is the provision of a liquid-cooled cylinder, more particularly of light metal for high-powered engines, which is equipped with a cooling jacket integral with the cylinder head and accommodates a liner inserted from below for the guidance of the piston so as to be closely surrounded by the cylinder and thus arranged out of direct contact with the cooling liquid. It is important in engines of this type, that the liner be held in permanent intimate contact with the cylinder at all operating conditions to prevent local overheating owing to the accumulation of heat in the liner at the points of imperfect contact with the cylinder wall.

It is the object of my invention to secure such permanent intimate contact and to prevent the combustion gases from entering between the cylinder and the liner. For the attainment of this object, the liner is provided with a thread of but a few turns near its lower end and the cylinder is provided with a mating thread near its lower end and with an internal peripheral shoulder near its upper end and the liner is inserted in the cylinder by a shrinking operation to tightly engage the shoulder. Thus, the end face of the liner is firmly pressed against the internal shoulder of the cylinder and the combustion gases cannot enter therebetween.

In order to facilitate the shrinking operation, I prefer to make the cylinder block of a material having a higher coefficient of thermal expansion than the material of the liner. The elements are preferably so dimensioned that the liner can just be introduced and screwed into the cylinder when both elements are heated to a temperature higher than the operating temperature of the engine, whereby the contacting cylindrical and annular faces of the liner and the cylinder will be firmly pressed upon each other, when the temperature drops to the operating limit owing to the fact that the cylinder shrinks more than the liner. The provision of the threads enables the liner to resist axial forces which may be set up by the combustion of the fuel without being liable to be displaced in the cylinder even if the forces should be high enough to overcome the friction between the liner and the cylinder.

It has been proposed prior to my invention to provide the liner with a thread substantially co-extensive with the entire length of the liner. This construction, however, has the disadvantage that, owing to the different expansion, the thread of the liner and that of the cylinder will not properly fit, when heated to the temperature required for the shrinking operation, so that the liner may stick when screwed halfways into the cylinder. Moreover, the thread offers an undesirable resistance to the passage of heat from the liner to the cylinder.

It has been also proposed prior to my invention to provide only the upper portion of the liner with the thread engaging a corresponding thread provided in the cylinder. In this construction, the smooth section of the liner must have a larger diameter than the thread requiring the liner to be made comparatively thick and heavy which is undesirable.

Attempts of fitting the liner in the cylinder without any thread have not been successful. Owing to the repeated heating and cooling of the liner in practical operation, an axial displacement occurs whereby a gap is formed at the end face of the liner permitting the combustion gases to enter. This produces local overheating of the liner.

Three preferred embodiments of my invention are illustrated in the drawing, in which, Fig. 1 illustrates a cross-section through my improved internal combustion engine in which the liner is provided with but one annular contacting face at its upper end;

Fig. 2 illustrates a partial cross-section through a modification in which the liner is formed with a collar near its lower end providing for a second annular contacting face;

Fig. 3 is a partial cross-section of the modification illustrated in Fig. 2, but taken at right angles to Fig. 2 to illustrate the position of the cylinder valve; and Fig. 4 is a cross-sectional view similar to Fig. 2, illustrating a third modified structure.

In Fig. 1, 10 is the cylinder of aluminum or another light metal which may form part of a cast cylinder block comprising a number of cylinders and is preferably formed integral with the cylinder head 11 and with the cooling jacket 12 which surrounds the cylinder 10 and the head 11 and through which a suitable cooling liquid is circulated. At 13 I have indicated a fuel injector for engines of the Diesel type. It is to be understood, however, that my invention is equally applicable to other types of internal combustion engines, for instance to the carbureter type.

The cylinder is provided with an internal peripheral shoulder 14 near its upper end and with a thread 15 near its lower end. This thread comprises but a few number of turns, for instance six turns.

A liner 16 is tightly fitted in the cylinder so that the annular face of its upper end tightly abuts against the annular face of the shoulder 14. Near its lower end, the liner 16 is provided with a thread engaging the thread 15 which also comprises but a few number of turns so that the insertion of the liner requires but a few revolutions thereof.

The liner is made of a material which has a lower coefficient of thermal expansion than the cylinder. If the cylinder consists of aluminum, the liner may consist of steel.

In this embodiment, the liner is supported by the crank case 17 and, in its turn, freely supports the cylinder block. For this purpose, the liner 16 is provided with a flange 18 at its lower end fitted on a corresponding flange of the crank case bolted thereto. The piston 19 is connected with the crank shaft 20 in the customary manner by a connecting rod 21.

The liner is so dimensioned with regard to the cylinder that when it is in disassembled condition and at normal temperature, its outer diameter is larger than the inner diameter of the cylinder 10 at normal temperature. The difference of the diameters is so chosen that the liner will just fit into the cylinder when the same is heated to a temperature above the highest operating temperature of the engine. When the liner has been inserted, the cylinder is permitted to cool and when it reaches the operating temperature, it will be tightly pressed on the liner owing to the difference of the coefficients of thermal expansion. Similarly, the shoulder 14 will tightly press against the end face of the liner whereby the entrance of combustion gases therebetween is prevented.

In the embodiment of Figs. 2 and 3, the cylinder 110 is directly supported by the crank case 117 and for this purpose is made integral therewith. In all other respects, the cylinder 110 is similar to the cylinder 10 and, for this reason, the corresponding parts thereof are designated by the same reference numerals. The liner 116 differs from the liner in Fig. 1 by the provision of a collar 22 near its lower end which tightly contacts the lower end face 23 of the cylinder 110. In this embodiment, the distance of the collar 22 of the liner from the upper end thereof is larger than the distance of the end face 23 from the shoulder 14 of the cylinder when the parts are in disassembled condition and at normal temperature. Similarly, the normal diameter of the liner is larger than the normal diameter of the cylinder. The difference in dimensions is so chosen that the liner will just fit into the cylinder when the parts have been heated to a temperature far above the operating temperature of the engine. When the parts are so heated, the cylinder of aluminum will expand considerably more than the liner of steel because of the higher coefficient of expansion of aluminum compared with that of steel. Owing to the axial expansion, the collar 22 only will contact the end face 23 of the cylinder, while the shoulder 14 will not contact the end face of the liner until the elements have cooled off a certain amount. When the parts are permitted to cool further off and reach the operating temperature, the radial and axial contraction of the cylinder block causes the cylindrical contact faces and the annular end face of the liner and the face of the shoulder 14 to be tightly pressed upon each other thus producing an effective seal preventing combustion gases from entering.

The dimensions are so chosen that a sufficient pressure is attained when the elements cool to the operating temperature of the engine after the assembly.

In the embodiment of Fig. 2, three pairs of contacting faces provide for an efficient seal, to wit the contacting cylindrical faces and the two pairs of annular faces at 14 and 23.

If desired, the collar 22 may engage a conforming recess provided at the lower end of the cylinder. Such a construction is illustrated in Fig. 4. In all other respects, however, it is similar to the construction in Figs. 2 and 3, and the same reference numerals have accordingly been applied.

The terms "normal diameter" or "normal length of distance" used in the claims relate to the dimensions of the elements measured at normal temperature and in disassembled condition.

While I have described three specific embodiments of my invention, I wish it to be understood that the same is not restricted to the details thereof but capable of numerous modifications without departing from the spirit of my invention.

What I claim is:

1. In an internal combustion engine, the combination comprising a cylinder provided with an internal peripheral shoulder near its upper end, with an internal thread near its lower end and with a lower end face at a certain distance from said shoulder, and a liner provided with an external thread engaging said internal thread and with a collar at a certain distance from its upper end and fitted in said cylinder so as to engage said shoulder and said lower end face of the cylinder, the normal diameters of said cylinder and said liner and the normal lengths of said distances differing by amounts substantially equalling the relative expansion of said diameters and of said distances when said elements are heated from normal temperature to a temperature higher than the operating temperature of the engine, whereby due to contraction, the contacting cylindrical surfaces and annular faces remain tightly pressed upon each other at the operating temperature of the engine.

2. In an internal combustion engine, the combination comprising a cylinder provided with an internal peripheral shoulder near its upper end and with an internal thread near its lower end, and a liner for said cylinder having an external thread near its lower end engaging said internal thread for pressing the other end of said liner against said shoulder, the normal diameters of said cylinder and liner, and the normal lengths of the distances from said shoulder to said internal thread and from the abutting end of said liner to said external thread differing by amounts substantially equal to the relative expansion of said diameters and distances when said cylinder and liner are both heated from normal temperature to a temperature above the operating temperature of the engine, whereby upon contraction to ordinary operating temperature of the engine, the contacting cylindrical and annular surfaces will remain tightly pressed together.

ARTHUR BERGER.